US007526452B2

(12) United States Patent
Agarwal et al.

(10) Patent No.: US 7,526,452 B2
(45) Date of Patent: Apr. 28, 2009

(54) APPARATUS, METHODS AND COMPUTER PROGRAMS FOR METERING AND ACCOUNTING FOR SERVICES ACCESSED OVER A NETWORK

(75) Inventors: Vikas Agarwal, New Delhi (IN); Neeran M Karnik, New Delhi (IN); Arun Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 10/319,983

(22) Filed: Dec. 16, 2002

(65) Prior Publication Data

US 2004/0117311 A1 Jun. 17, 2004

(51) Int. Cl.
G06Q 99/00 (2006.01)
(52) U.S. Cl. .............................. 705/52; 709/229; 725/9
(58) Field of Classification Search ................ 709/229, 709/203, 224; 725/9, 10, 11; 370/354
See application file for complete search history.

(56) References Cited

U.S. PATENT DOCUMENTS

| | | | |
|---|---|---|---|
| 6,266,401 | B1 | 7/2001 | Marchbanks et al. |
| 6,405,251 | B1 | 6/2002 | Bullard et al. |
| 2002/0083003 | A1 | 6/2002 | Halliday et al. |
| 2003/0046409 | A1* | 3/2003 | Graham ...................... 709/229 |
| 2003/0110485 | A1* | 6/2003 | Lu et al. ........................ 725/9 |

FOREIGN PATENT DOCUMENTS

| | | |
|---|---|---|
| WO | WO 96/18939 | 6/1996 |
| WO | WO 00/22806 | 4/2000 |

OTHER PUBLICATIONS

Christine Hudgins-Bonafield, Selling Knowledge on the Net, Jun. 1, 1995, Network Computing, p. 102.*

Vijay Naik, Giovanni Pacifici, Asser Tantawi, Alaa Youssef, Mangala Gowri, Ashish Kundu, and Pradeep Varma, "eUtopia: A Framework for Managing Web Utility Services", in Proceedings of the OOPSLA Workshop on Object-Oriented Web Services, Tampa, USA, Oct. 2001.

(Continued)

*Primary Examiner*—James P. Trammell
*Assistant Examiner*—Behrang Badii
(74) *Attorney, Agent, or Firm*—Gibb & Rahman, LLC

(57) ABSTRACT

Apparatus, methods and computer programs provided for metering and accounting in a commercial e-services infrastructure address the requirement for handling composite services in which higher-level services are built using simpler underlying services, each of which may be autonomously owned and operated. Metering records for each service underlying a composite service are correlated by a process associated with the composite service, and then sent to an accounting service where they can be aggregated. The correlation is performed in a distributed manner with correlated usage data provided on a per-request basis. Accounting services can take account of the usage and charges associated with the underlying services to provide accounting and billing on a per-request basis or per customer-provider pair for a billing period.

8 Claims, 7 Drawing Sheets

OTHER PUBLICATIONS

I. Foster, C. Kesselman, J. Nick, and S. Tuecke, "The Physiology of the Grid: An Open Grid Services Architecture for Distributed Systems Integration", Jan. 2002.

S. Tuecke, K. Czajkowski, I. Foster, J. Frey, S. Graham, and C. Kesselman, Grid Service Specification, Feb. 2002.

W. Eibach and D. Kuebler, "Metering and accounting for Web services—a dynamic e-business solution", IBM Corporation, Jul. 2001.

A. Sahai, J. Ouyang and V. Machiraju, "Extending ARM for End-to-End Correlation and Optimization of E-service Transactions", HPL-2000-168, Hewlett Packard Laborations, Dec. 11, 2000.

A Sahai, J. Ouyang, V. Machiraju and K. Wurster, "End-to-End E-service Transaction and Conversation Management through Distributed Correlation", HPL-2000-145, Hewlett Packard Laboratories, Nov. 7, 2000.

\* cited by examiner

| request-id | service-id | user-id | operation | list of req ids | metric-1 | | metric-n |

| request-id | service-id | user-id | operation | metric-1 | metric-2 | | metric-n |

APPARATUS, METHODS AND COMPUTER PROGRAMS FOR METERING AND ACCOUNTING FOR SERVICES ACCESSED OVER A NETWORK

CROSS-REFERENCE TO RELATED APPLICATIONS

The present application is related to co-pending, commonly-assigned U.S. patent application Ser. No. 10/320,317.

FIELD OF INVENTION

The present invention relates to apparatus, methods and computer programs for metering or metering and accounting for services accessed programmatically over a network.

BACKGROUND

Services that deliver software functionality or access to remote resources and that can be programmatically accessed over a network are attracting in-creasing interest in the academic and industrial research communities, for several reasons. Such services, referred to herein as "e-Services", may be thought of as a component technology for building distributed applications, or as a mechanism for distributed systems integration. In addition, software services can help build and deploy "e-utilities" (see Vijay Naik, Giovanni Pacifici, Asser Tantawi, Alaa Youssef, Mangala Gowri, Ashish Kundu, and Pradeep Varma, "eUtopia: A Framework for Managing Web Utility Services", in Proceedings of the OOPSLA Workshop on Object-Oriented Web Services, Tampa, USA, October 2001). The e-utilities paradigm envisages on-demand delivery of software and computing power to end-users over the Internet—analogous to traditional utilities such as electricity and telephone service.

"Web services" comprising software services that are accessible via the World Wide Web have emerged as the technology of choice for this paradigm. Web services are described in S. Graham, S. Simeonov, T. Boubez, G. Daniels, D. Davis, Y. Nakamura, and R. Neyama, "Building Web Services with Java: Making Sense of XML, SOAP, WSDL, and UDDI", Sams, 2001. Usually, a specific set of Web-related standards are used such as SOAP for messaging, HTTP as the transport mechanism, WSDL for service description, and UDDI for service registration and discovery. However, other kinds of e-Services are also gaining importance. For example, grid services are an emerging mechanism for making distributed, heterogeneous resources available to end-users over a network—as described in I. Foster, C. Kesselman, J. Nick, and S. Tuecke, "The Physiology of the Grid: An Open Grid Services Architecture for Distributed Systems Integration", January 2002. Grid computing middleware enables the transparent sharing of such resources, typically within closed communities (known as virtual organizations). Such middleware is described in S. Tuecke, K. Czajkowski, I. Foster, J. Frey, S. Graham, and C. Kesselman, Grid Service Specification, February 2002. (At the time of writing, the two Grid Services papers mentioned above are available at www.globus.org/research/papers.html).

As more and more e-services are built for commercial purposes, they will inevitably be fee-based—a service provider will levy a charge for using a service. This implies a need for metering and accounting of service usage. Even in non-commercial settings, metering and accounting are needed for enforcing site-specific policies such as usage quotas.

The metering and accounting problem is more complex when the service required to satisfy a request is a composite of a number of (typically simpler) underlying services, each of which may be autonomously owned and operated. There is a need in the art for metering and accounting solutions which address these requirements and provide improved usage metering and accounting for composite services.

Metering and accounting systems have existed in various forms in the pre-services world. Operating systems such as UNIX™-compliant operating systems perform rudimentary accounting of resource usage. For example, per-user disk usage is tracked and quotas can be enforced. IBM Corporation's z/OS operating system's MVS System Management Facilities provide detailed logs of resource usage on a per-process basis, and provide utilities to generate accounting information using these logs. However, these accounting mechanisms do not apply in the services domain, where per-request metering is desirable. IBM, z/OS and MVS are trademarks of IBM Corporation.

U.S. Pat. No. 6,266,401 discloses a system and method for billing in telephony networks—generating a single invoice for various telephony services used by a user, such as voice, paging, data, etc. U.S. Pat. No. 6,266,401 does not disclose metering and accounting for more general networks and services, nor the problems of metering and accounting for composite services.

Published U.S. patent application Ser. No. 2002/0083003 discloses time or usage based metering of a client application, or application feature usage, and the reporting of this use to a site on a public network. A set of metering monitor programs receive and batch tool usage information for communication to a Metering server program which collates the information and applies the collated information in the form of credit deductions from a user's credit pool. There is no disclosure of the problems of per-request accounting for composite services.

W. Eibach and D. Kuebler, "Metering and accounting for Web services—a dynamic e-business solution", IBM Corporation, July 2001, describes metering Web service usage, and the subsequent accounting and billing in accordance with a pricing model using the metric of response time, but does not describe a solution for metering and accounting of composite services which invoke underlying services.

A. Sahai, J. Ouyang and V. Machiraju, "Extending ARM for End-to-End Correlation and Optimization of E-service Transactions", HPL-2000-168, Hewlett Packard Laboratories, Dec. 11, 2000 discloses extending Application Response Measurement for correlation of transactions spanning multiple e-Services. Correlation for transactions spanning multiple e-Services is disclosed, but there is no disclosure in HPL-2000-168 of a service-usage accounting solution. In particular, there is no disclosure of a service-usage metering and accounting solution which provides per-request accounting for composite services.

A. Sahai, J. Ouyang, V. Machiraju and K. Wurster, "End-to-End E-service Transaction and Conversation Management through Distributed Correlation", HPL-2000-145, Hewlett Packard Laboratories, Nov. 7, 2000 describes a distributed correlation approach for correlation of conversations and transactions spanning multiple distributed services. There is no disclosure in HPL-2000-0145 of a service-usage metering and accounting solution which provides per-request accounting for composite services.

U.S. Pat. No. 6,405,251 discloses a system for collecting and aggregating data from network entities for a data consuming application. The system includes a data collector layer to receive network flow information from the network entities and to produce records based on the information. The system also includes a flow aggregation layer fed from the data collection layer and coupled to a storage device. The flow aggregation layer receives records produced by the data collector layer and aggregates received records. U.S. Pat. No. 6,405,251 discloses an accounting process receiving different types of data from the network via the data collector layer and assembling the data into an accounting record that can be used by billing or other user-defined data consuming applications. Although U.S. Pat. No. 6,405,251 discloses aggregation of data from separate sources, such as for billing of total network usage, there is no disclosure of a solution for providing per-request accounting for usage of composite services.

WO 00/22806 discloses an accounting framework for a communications system having a plurality of service providers. Accounting units including usage data are exchanged between service providers to allow charging for usage of services. Consolidated billing is disclosed for groups of subscribers, but there is no disclosure of a solution for per-request metering and accounting for composite services.

WO 96/18939 discloses monitoring of software usage, and determining a cumulative usage value for a function group. There is no disclosure of a solution for per-request metering and accounting for composite services.

SUMMARY OF THE INVENTION

A first aspect of the present invention provides a method for metering usage of services accessed via a network in which requested composite services can invoke underlying component services in order to satisfy a request. According to the method, a requested composite service invokes a set of component services as required to satisfy the request, and records identifiers of the set of invocations. Each invoked component service returns to its requester composite service measured service usage data corresponding to the invocation from the requester composite service, together with the respective invocation identifier. The requester composite service correlates the measured service usage data received from its respective set of component services by reference to the set of invocation identifiers, and outputs the correlated measured usage data. Preferably, the correlated measured usage data is output in response to a positive determination that measured service usage data has been successfully correlated for the complete set of requested component services.

In a preferred embodiment, an invoked component service can invoke a set of additional component services as required to satisfy the request, recording identifiers of the set of invocations. Each additional invoked component service returns to its requester service measured service usage data corresponding to the invocation from the respective requester service, together with the respective invocation identifier, and each requester service correlates the measured service usage data received from its respective set of component services by reference to the set of invocation identifiers, and outputs the correlated measured usage data.

A second aspect of the present invention provides an apparatus for metering for usage of services which are accessed via a network. The services can include composite services composed of a set of component services—typically simpler, underlying services which are invoked by the requested service—and the metering takes into account the service usage of the set of component services underlying such composite services. One or more metering components are associated with specific services, for measuring usage of the services. When a component service is requested in response to a request for a composite service, the measured usage data for the component service is provided to a correlator associated with the composite service. The correlator uses an identification of the requests sent from the composite service to component services to correlate the measured usage data for the set of services (the composite service and the component services) which corresponding to the request for the composite service. The correlator can then send the correlated data to an accounting service which is typically remote from the composite service. The accounting service can then generate service usage accounting data for the set of services, either to provide per-request metering and accounting data for usage of the requested composite service, or for accounting for each 'customer-provider' or 'user-service' pair over a period of time (e.g. billing cycle).

A third aspect of the present invention provides a method for metering usage of services which are accessed via a network. In response to a request for a composite service which requires one or more component services to satisfy the request, requests are sent to the one or more component services and the requests contain information for enabling measured usage data for the component services to be provided to a correlator associated with the composite service. The correlator is also provided with an identification of the requests sent to component services. In response to the correlator receiving measured usage data for the composite service and the one or more component services, the identification of the requests to component services is used to correlate the measured usage data for the set of services corresponding to said request for the composite service. Service usage accounting data for the requested set of services may be generated using the correlated measured usage data.

In a preferred embodiment of the invention, a process associated with the composite service identifies a set of requests from the composite service for component services, which requests result from the request for the composite service, and provides the request identifiers to its local correlator. The requests for component services identify the requesting composite service or its local correlator to indicate where measured usage data should be sent. The local correlator receives and correlates this usage data for the composite service and requested component services by reference to the provided request identifiers and by reference to request identifiers within received usage data.

Different component services, which each perform operations in order to satisfy a single composite service request, may be autonomously operated and may be independent of each other except for their association with the current service request. Some component services of a composite service will themselves be composite services. Preferred embodiments of the invention provide per-request usage metering for arbitrarily complex hierarchies of composite services—checking whether each service invoked by a requested service invokes any additional services to satisfy the request.

Preferred embodiments of the invention provide support for accounting for composite services which takes account of differences between the usage charging models of the composite service and of the invoked underlying services.

Preferred embodiments of the invention support metering and accounting in terms of application-level usage units and usage measurements expressed in resource consumption units.

Further aspects of the invention provide one or more of a monitoring component, a metering component and a correlator associated with a composite service, and/or an accounting component and a billing component for use in a method or apparatus as described above for implementing metering and preferably accounting of network accessible service usage.

The present invention can be implemented in a data processing network which includes one or more computer program products comprising computer program code for controlling the operation of the respective data processing apparatus on which they run to perform a method as described above.

The invention is advantageous for metering and accounting for usage of Web services, resources wrapped as services, and grid services. Architectures for the latter are described by V. Agarwal, N. Kamik and A. Kumar in "Architectural Issues for Metering and Accounting of Grid Services", IBM Research Report RI 02010, Apr. 4 2002, which is hereby incorporated herein by reference.

BRIEF DESCRIPTION OF DRAWINGS

One or more embodiments of the invention will now be described, by way of example, with reference to any one or more of the accompanying drawings in which.

DETAILED DESCRIPTION OF PREFERRED EMBODIMENTS

Monitoring, Metering, Accounting and Billing

Figure 1:
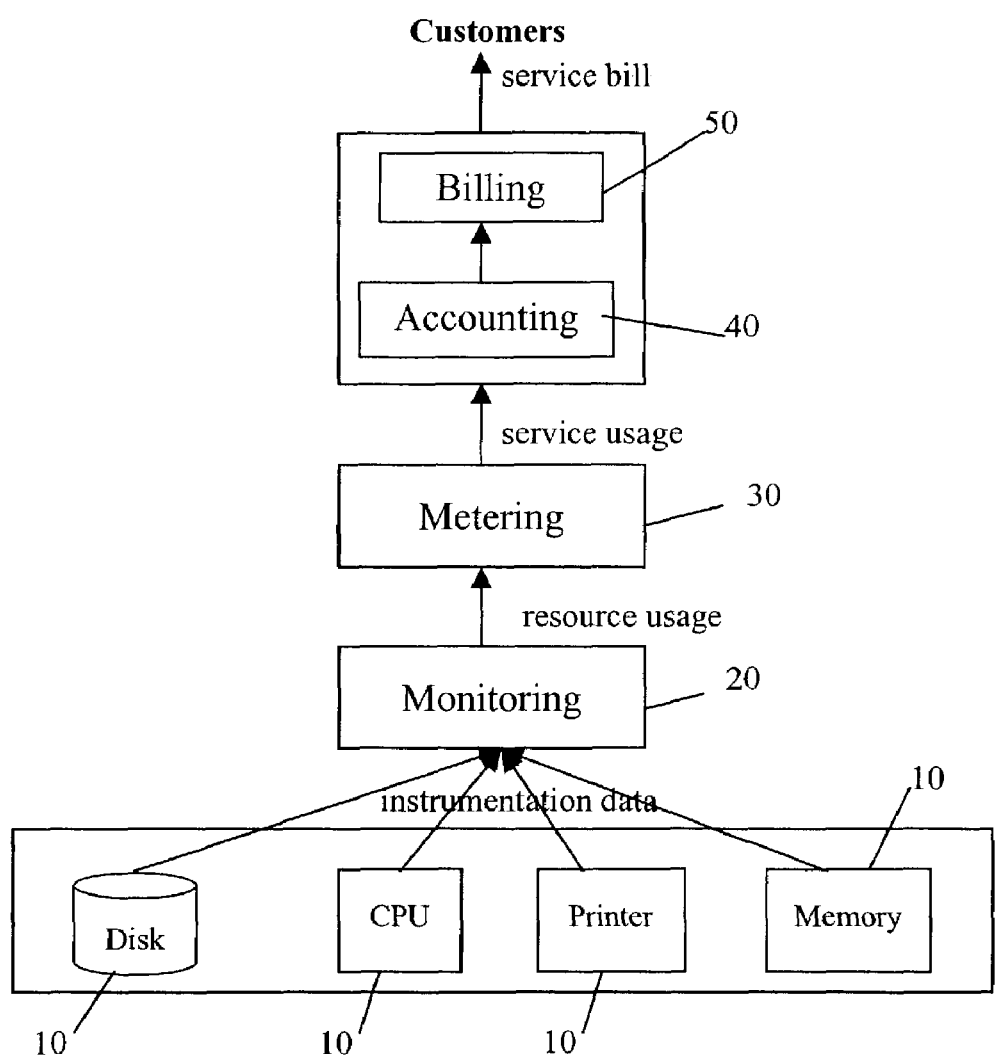
FIG. 1 is a schematic representation of a set of modules for an e-services metering and accounting architecture according to an embodiment of the invention.

FIG. 1 depicts the modules of a runtime infrastructure for commercial e-services, and shows the information that flows to enable accounting of service usage. The service provider's resources 10 are instrumented to collect data for usage metering, as well as to enable other purposes such as quality of service management and load balancing. The data output by the instrumented resources is sent to a Monitoring module 20 which collects the raw data and provides only the usage-related data to a Metering module 30. Metering is responsible for computing service usage metrics, using the monitored resource usage data if appropriate. An Accounting module 40 aggregates the service usage by specific users (or accounts), and a Billing module 50 applies service provider-defined pricing schemes to the aggregated usage data, and generates invoices for the users. The design of these architectural components is influenced by several factors, as discussed below.

Pricing, Charging and Business Models

The Charging policy of a service defines its usage-charge metrics, in terms of which clients are charged and how chargeable usage is assessed. Some services may use resource consumption measures—e.g., a compute service may use CPU cycles consumed by the user's job as its charging metric. Other services may have pre-defined costs per request, or a cost that varies predictably with certain parameters of the request. For example, a stock trading service may charge a fixed commission per trade, or a percentage of the total value of the trade. Since the charging policy determines the usage metrics, this is taken account of in the design of the Metering module.

Service providers may have different types of business relationships with their customers. For instance, some customers may be subscribers having a long-running association, while others may be one-off users on a pay-per-use model. Such factors determine how the customer's usage is aggregated over time. The Business model that defines the relationship between the customer and the service is taken account of in the Accounting module.

A Taxonomy of e-Services e-Services can be classified into the following two types:

Resource-centric (Type R) services: These can be thought of as wrappers around resources. A computing service, file storage service, or a remote interface to a printer fall into this category. These services offer their clients the use of a resource either by allocating a fraction of the resource capacity, or by allowing the client to consume a certain amount of the resource. When capacity is allocated, the service charges users on the basis of resource usage over time e.g. a computing service charges its users for CPU-seconds used; the file storage service charges for megabyte-hours of storage. When resources are consumed, the charging is on the basis of the amount of resource used—e.g. the printer service may charge on the basis of the sheets of paper used and the amount of ink consumed.

Transactional (Type T) services: These are services with a transactional (request-response) character, where a user requests certain function from the service, and is charged for that functionality—not for its resource consumption. An example is an email delivery service. A user sends an email message to the delivery service, with addressing information etc., and requests message delivery. Charging for this service would typically be on the basis of the number of messages (or bytes) delivered rather than the CPU time, disk space or network bandwidth consumed by the service in delivering the messages. Service usage is thus expressed using application-level parameters rather than server-side resource usage metrics. For transactional services, such charging is more intuitive and predictable for the user, and more easily auditable as well.

It is possible that an e-service inherently belongs to one of the above categories, but its provider chooses to charge for it according to the charging typically used for another service type. For example, the printer service above is inherently resource-centric (since it consumes resources in providing its service), but the service provider may choose to charge on the basis of the number of input pages to be printed since this makes the cost more easily predictable by the client. This results in a transactional charging model. From the perspective of metering, the provider's choice of charging model dominates over the inherent model.

These distinctions result in fundamental differences in the way such services are metered and accounted for. In general, the service usage metrics chosen by the service provider may consist of resource usage metrics, application-level parameters, or some combination of both. Resource-centric services need active metering of underlying resource usage, because their usage cannot be predicted from the request parameters. In contrast, transactional services only need passive logging of requests and their parameters for later accounting.

e-Service Composition

Complex services can be created by composing simpler ones. When such a composite service receives a request, its business logic may require multiple requests to underlying, autonomous services to satisfy the in-coming request. Each underlying service may in turn be composite. Thus, a hierarchy of service invocations results from the incoming top-level request. An example can be seen in FIG. 2, which will be described in more detail below under the heading 'Metering and Accounting Architecture for Composite e-Services'. Each invoked service treats its caller as its client, and charges the caller for its usage. Thus, the end-user's charges should include all such underlying charges. Composition therefore places significant requirements on the metering and accounting infrastructure.

The bottom-most nodes in composition hierarchies tend to be resource-centric services whereas services in higher levels are typically more transactional in nature. Given this scenario, pairwise service composition would fall into one of the following categories:

Transactional service over Resource-centric service (Type ToverR): Transactional services are of-ten hosted over infrastructure components, which are offered as resource-centric services. Each resource-centric service would treat the hosted service as its customer, meter its resource consumption and charge accordingly. On the other hand, the transactional service would charge its customers based upon its application-level request parameters, irrespective of its usage of the underlying service. The metering information of the underlying service would contain resource consumption metrics, whereas that of the transactional service would contain service usage metrics. An example of this category is a directory service using a storage service.

Composite Resource-centric service (Type. RoverR): This class represents resource-centric services that utilize other resource-centric services. For instance, a scientific algorithm may be offered as a service running on top of a compute service. In this model, the software being offered is treated just like any other resource and metered accordingly. This approach is justified when the software's resource usage varies widely with its input parameters, and cannot be predicted within reasonable limits. The underlying resource-centric service would charge the top-level service based on the actual hardware resources consumed. The top-level service would in turn charge its users for both the hardware and the software usage. The usage metrics exported by the top-level service would include software usage metrics as well as the metrics exported by the lower-level service. Therefore, active metering is required for both services.

Composite Transactional service (Type ToverT): This class represents transactional services using other transactional services. The metering information for each of these services would contain the respective application-level usage metrics. For example, a message delivery service may use either an email service or an instant messaging service for delivery, based on user presence and preferences. Each of these services is transactional.

Resource-centric service over Transactional service (Type RoverT): Sometimes, a resource-centric service requires the use of a transactional service. Whereas it reports its usage in terms of resource consumption, it may be charged by its underlying service on a per-transaction basis. For example, the scientific algorithm mentioned above may also need to process sensor data. The algorithm itself is resource-centric, whereas a sensor service can provide the latest sensor readings on request using a transactional charging model.

The charging model of the higher-level service determines the charging model of the pairwise composition, so that when the pair is itself used as a component in another composition, the resultant charging model may be unambiguously determined. Further, within a given service, it may be desired to support different models for different operations. Thus, one method invocation may be Type R whereas another may be Type T. Composition could then be considered at the granularity of each operation of a service.

Metering and Accounting Architecture for Composite e-Services

An architecture for metering and accounting of composite e-service usage is described below with reference to FIG. 2, together with a description of how the metering records of different types of services in a composition hierarchy can be aggregated. The architecture supports metering at request-level granularity and is generic enough to support different charging and business models as discussed previously.

Overview

Figure 2:
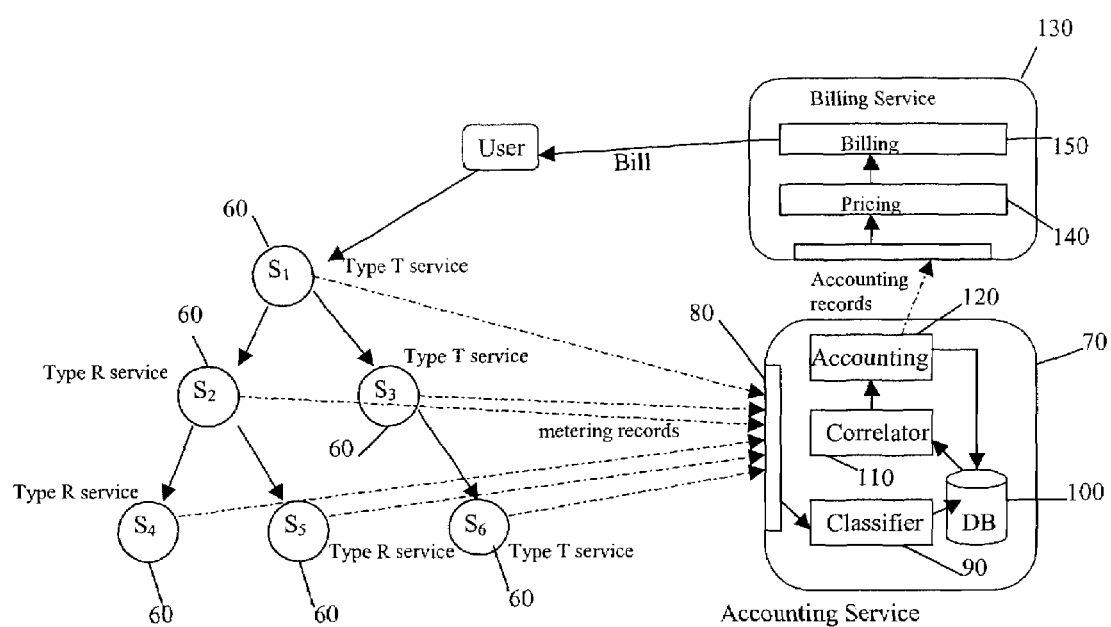
FIG. 2 shows a metering and accounting solution architecture according to an embodiment of the invention.

FIG. 2 shows a metering and accounting architecture in the context of a composite service hierarchy consisting of services S1 through S6. Each service 60 registers with the Accounting service 70. During this process, a service 60 specifies the business models it supports, the names of the usage metrics and the functions to aggregate different values of those usage metrics, and the type of each operation R or T. This information is useful for handling different charging models, and because the metrics may not be so generic that the accounting service can interpret them easily. The accounting service is provided with the data type of those metrics and the function needed to aggregate values of those metrics. The information is also used while correlating requests for that service, as explained in more detail below.

Raw usage data may be measured by monitoring agents (such as IBM Corporation's Tivoli monitoring agents) or operating system level utilities or monitoring functions provided by the application itself. In a preferred embodiment, each service 60 incorporates a monitoring module 20 and a metering module 30 (see FIG. 1—not shown in FIG. 2). However, the monitoring module is required only if the service uses resource consumption metrics among its usage metrics. These monitoring and metering modules comprise code modules installed on a respective computer associated with each service. The monitoring module 20 measures raw resource usage and sends this data to the metering module, together with a service request identifier. Note that the metrics supplied by the monitoring module in this embodiment are raw resource data and not service usage metrics. Examples of such raw metrics could be CPU cycles consumed, peak memory used, etc.

Figure 4:
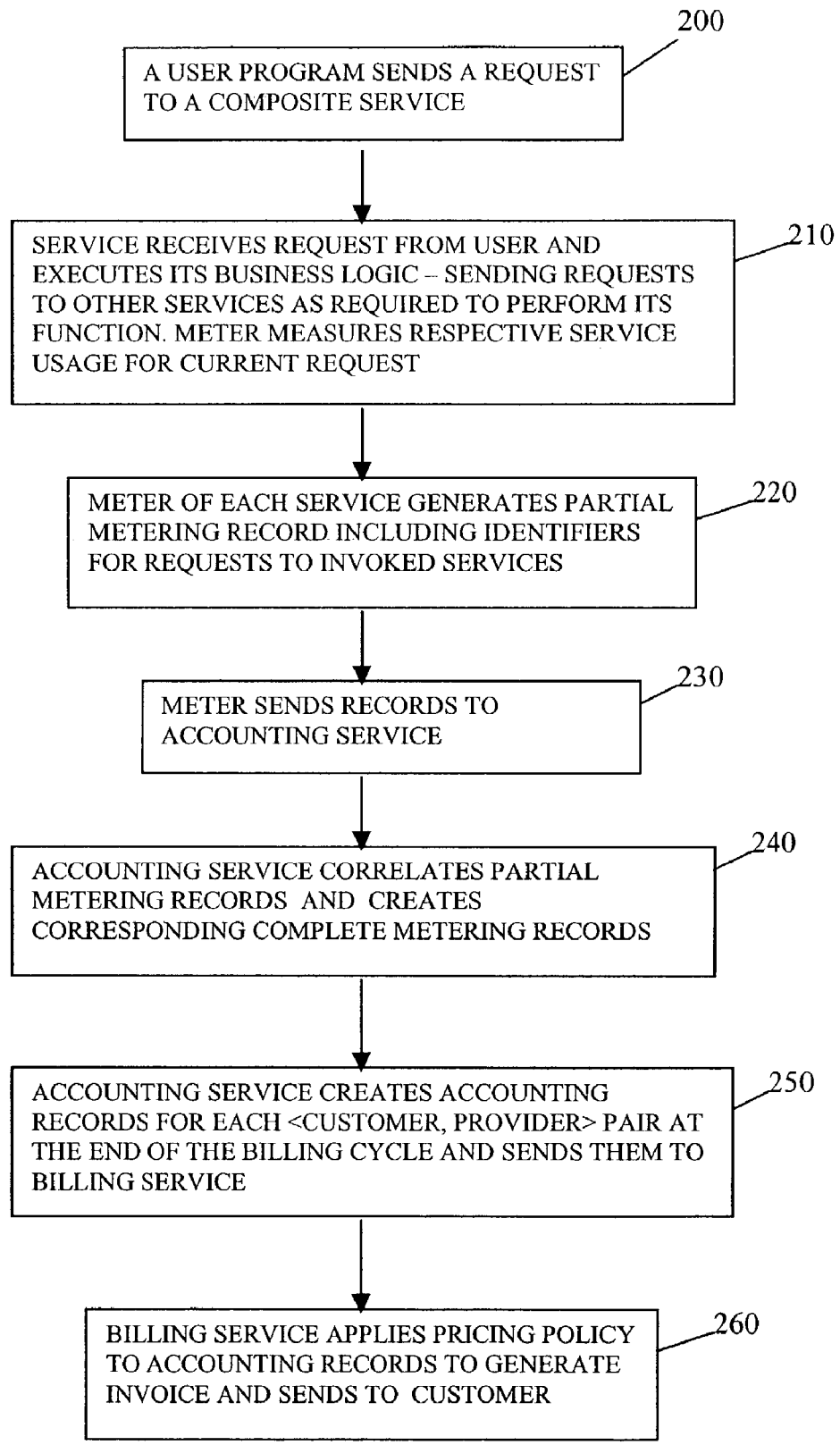
FIG. 4 shows the sequence of steps involved in processing metering and accounting information for composite services according to an implementation of the invention.

Referring to FIG. 4, the metering and accounting method is initiated when a user program sends 200 a request to a composite service 60. The service 60 receives the request from the user and executes 210 its business logic—sending requests to other services as required to perform its function. Raw usage data is generated 210 periodically by the monitoring agents during the execution of the request. The metering module computes 220 usage metrics by aggregating these periodic values at the end of the request. The metering record is partial if it represents the usage information of that service only and does not include the usage information of underlying component services (see details below).

For each service request handled, the metering module 30 uses the data output by the monitoring module 20 to generate 220 a 'partial metering record', which contains usage data in terms of service usage metrics, and reports the per-request usage to the Accounting Service 70 by sending 230 this partial metering record. The metering record is partial because it contains metrics pertaining to the current service 60 alone—without metrics for underlying services at this stage. When a requested service invokes functions of other services to satisfy the request, the request IDs of these resulting invocations are included in its partial metering record.

The communication mechanism for sending 230 records to the Accounting service is dependent on the environment within which these services execute—whether Web services, Grid services, Java™ objects or J2EE. For example, some systems may use SOAP/HTTP whereas others may use Java-RMI, etc.

According to different embodiments of the invention, the service meter may use local monitor data and/or application-level metrics in constructing partial records. The monitoring module can be an external monitoring agent, instead of being embedded within each service as described above, and both alternatives may exist within a single metering and accounting network so that the best mechanism is used for each service. An advantage of external agents is that they enable the choice of monitoring metrics to be independent of the service itself (although they may be derived from the information provided by the service) such that the monitoring functionality can be improved over time. An embedded monitor, on the other hand, can optimize efficiency for service-specific monitoring but the scope and definition of monitoring is fixed once the service has been defined and implemented unless the service is itself modifiable at run time.

In the embodiment shown in FIG. 2 and FIG. 4, the partial metering record is sent 230 by the metering module 30 (see FIG. 1) to the Accounting Service 70 via service interface 80. The 'partial metering record' is self-sufficient for a leaf node (such as S4, S5 and S6, which do not use any other service), but is incomplete for other nodes in the composition hierarchy. Only a single message needs to be sent to the Accounting Service from each component service (in contrast to alternative communication protocols which require at least two messages to demarcate the start and end of each transaction). The Accounting Service 70 creates 240 a complete metering record for a request sent to a non-leaf service (such as S1), by correlating its partial metering record with the corresponding complete metering records of the underlying services (S2 and S3). Complete metering records for underlying services (such as S2) may themselves be formed similarly (correlating its record with that of S4 and S5).

A Classifier module 90 in the Accounting service 70 classifies an incoming metering record on per service, per user basis and stores it in the database 100. The Correlator module 110 reads these metering records from the database 100 and correlates them 240 using unique request identifiers to create complete metering records. The correlation step is described in more detail below. The Correlator 110 passes the complete records it creates to the Accounting module 120, which aggregates them 250 corresponding to each <customer, provider> pair. A 'customer' may be an individual user but, equally, several users may be part of the same customer. Similarly, a service is offered by a 'provider' entity, which may offer any number of services from one to many. The accounting happens on the basis of these customer-provider pairs since these are the real world entities that transact business, such that accounting records contain aggregated usage for all service requests for the <customer, provider> pair. Of course, <customer, service> pairs may be used instead where it is desired to maintain separate accounting for different services of a single provider.

The aggregation 250 results in the generation of accounting records. At each billing cycle the accounting service supplies these accounting records to the Billing Service 130. The Pricing module 140 of the billing service 130 applies a service-provider-supplied pricing function to these accounting records to compute 260 the amount to be billed to the user. The Billing module 150 then prepares the bills and sends them 260 to individual users. In some implementations, the Accounting and Billing functionality are combined into one service.

Correlation

The correlation mechanism 110 is designed to fulfill the following requirements:

Each request is uniquely identifiable, i.e. at any given time, no two requests in the system have the same identifier.

The correlation mechanism confirms that all the requests initiated by a service for an incoming request have completed (successfully or unsuccessfully) before computing the complete metering record for that request.

The correlation mechanism generates complete metering records not only for top-level requests, but also for each sub-request, because each calling service may need to be billed by the called service.

Since a service is free to choose its own accounting service, the correlation mechanism accommodates a scenario where different services in a composition hierarchy subscribe to different accounting services.

Each incoming request to a service contains a globally unique request identifier generated by the caller. Known UUIDs (Universally Unique IDs) can be used for this purpose. If the caller is a user application which does not generate such Ids, the called service locally generates an ID for the incoming request.

At the time of writing, UUIDs are described at Website www.opengroup.org/dce/info/draft-leach-uuids—guids-01.txt. An example generator for globally unique ids is the known Java™ UUID Generator, available from www.doomdark.org/doomdark/proj/jug/.

A service generates a metering record once it has finished its processing of the request. This implies that all invocations to underlying services have also been initiated by that time. This metering record contains the following information, as exemplified in FIG. 7A:

1. The globally unique request-id identifying the incoming request.
2. The service-id of the called current service.
3. The ID of the caller.
4. Name of the operation invoked (needed to determine the charging model and pricing for this request).
5. List of globally unique request-ids of invocations to underlying services.
6. The metering metrics and their values.

The Classifier 90 stores incoming metering records in the database 100 on a per customer, per provider basis. The Correlator 110 retrieves and processes these records either periodically, or when a new record is received, or when triggered by billing-related events. Pseudocode for an example implementation for the correlator 110 is shown below:

Correlator Implementation

```
function correlate(Record)
begin
        if      operationType(Record) = 'T'         // a record for transactional operation is always
                mark (Record, 'complete')           // self-sufficient and marked complete
                return                              // no need to aggregate further
        endif
    List = getInvocationList(Record)                // method for identifying requests to underlying
                                                    // services, returns List data structure
    if (List is empty)                              // if record is for a leaf node
        mark (Record, 'complete')                   // then record is complete - this is trivial case
        return
endif
if (complete(List))                                 // if List not empty then service is composite so
                                                    // need to check if all records for requests in the
                                                    // list are complete - if all are complete we have
                                                    // full information for service and can aggregate
            for each request ReqId in List
                MetRec = getMeteringRec(ReqId)      // get complete record from DB
                aggregate(Record, MetRec)           // compute the aggregate usage
            endfor
            mark (Record, 'complete')
    else                                            // if any record for request in List not complete
        skip this Record                            // skip correlation for this Record - it will be
                                                    // processed later
            endif
end
```

In a first example implementation, the correlation processing starts when triggered periodically on expiry of a timer. Referring to the above pseudocode, the correlator then attempts correlation for all of the uncorrelated records in the database for all services—identifying all records which are not yet marked complete and attempting to complete their correlation processing. All records are initially assumed to be partial. A record is marked as complete if it is determined to be for a transactional operation, because such operations do not depend on the usage of underlying services. A record is also marked as complete if the list of IDs of initiated requests is determined to be empty, in which case it is the metering record of a leaf-node. In either of these simple cases, the records passed on to the Accounting module 120 correspond to the metering record as retrieved from the database without requiring any aggregation with other records.

If the record is still marked partial, the correlator checks whether the metering records for requests to underlying services have been returned and complete metering records for all the underlying invocations have been computed (i.e. determining whether all underlying records are complete, in which case the complete record for the higher level service request can be computed). The correlator then gets the usage data of all underlying requests and aggregates them with the usage of this record. The aggregated data is used to create a complete metering record which is sent to the accounting module 120.

If any records for requests to underlying services are not yet marked complete in the database (as determined by reference to the set of records corresponding to the IDs of requests to underlying services), it is not yet possible to compute the composite metering record for the high level requested service, and so the correlator simply skips correlation processing for the high level service. The correlator repeats this periodic correlation processing until all records are marked complete in the database.

Correlation Across Accounting Services

The services in a composition hierarchy may subscribe to different accounting services, because each service is autonomous, and because sharing the accounting functionality amongst multiple accounting services improves the scalability of the system. Hence, there may be a need to correlate metering records using a distributed mechanism, across accounting services. To support this, the Correlator of the callee's accounting service must know the accounting service to which the caller subscribes. The Correlator checks whether the callee's accounting service is different from itself. If so, it sends the complete metering record to the caller's accounting service for further correlation along the composition hierarchy.

A first implementation for exchanging knowledge of accounting services between components is for the caller to send the address of its accounting service along with each request. The callee can include this address in the metering record sent to its own accounting service. To reduce the overhead, the address field may be left empty, indicating that a previously communicated address is still valid. Alternatively, the identity of the accounting service may be communicated during a handshake that occurs between client and service prior to any requests. Such a handshake may be needed anyway, for setting up service-level agreements for example.

Accounting and Billing

Users and services have accounts registered with the Accounting service. Multiple users in an organization may share an account. Similarly, all services offered by a single provider may share an account. Either <customer, provider> pairs may be used from the outset or the Accounting module may map user and service identifiers to their respective accounts. The Accounting module maintains the business relationships between these customer and service provider accounts. The business relationship describes the business model used—such as pay-per-use, subscription, lease, etc. This also determines whether a metering record contributes to the user's use charge or not. For instance in the lease model, the metering record is not used for billing, because the user pays a fixed amount for leasing the service for a given duration. The metering record is only used for maintaining an audit trail. Metering records will typically also be retained for auditing purposes in embodiments which do invoice users on a per-request basis. In the subscription model too, the metering record is usually not needed for billing, but it is used to compute the total usage by a user to ensure that the usage is within specified limits. The usage may get charged if the user exceeds these limits. But in the pay-per-use model, the metering record contributes to the actual charging. The described architecture does not constrain other kinds of business models, since usage information is always available at the granularity of a request.

The Accounting module 120 aggregates metering records into accounting records for each <customer, provider> pair for each request or for some specified period (a billing cycle) and adds business relationship-derived information as described above. Accounting records are supplied to the Billing Service. Its Pricing module contains the pricing formulae (charging rates, etc.) to be used. These may vary from customer to customer depending upon their contract with the service, discounts, etc. The pricing module computes the amount to be charged by applying the appropriate pricing formula to the accounting records. This information is passed to the Billing module which prepares the invoice and sends it to the user using the preferred delivery mechanism such as postal mail, email, etc.

Example Implementation

A first example implementation, which demonstrates metering and accounting for a sample composite service, is described hereafter.

Figure 3:
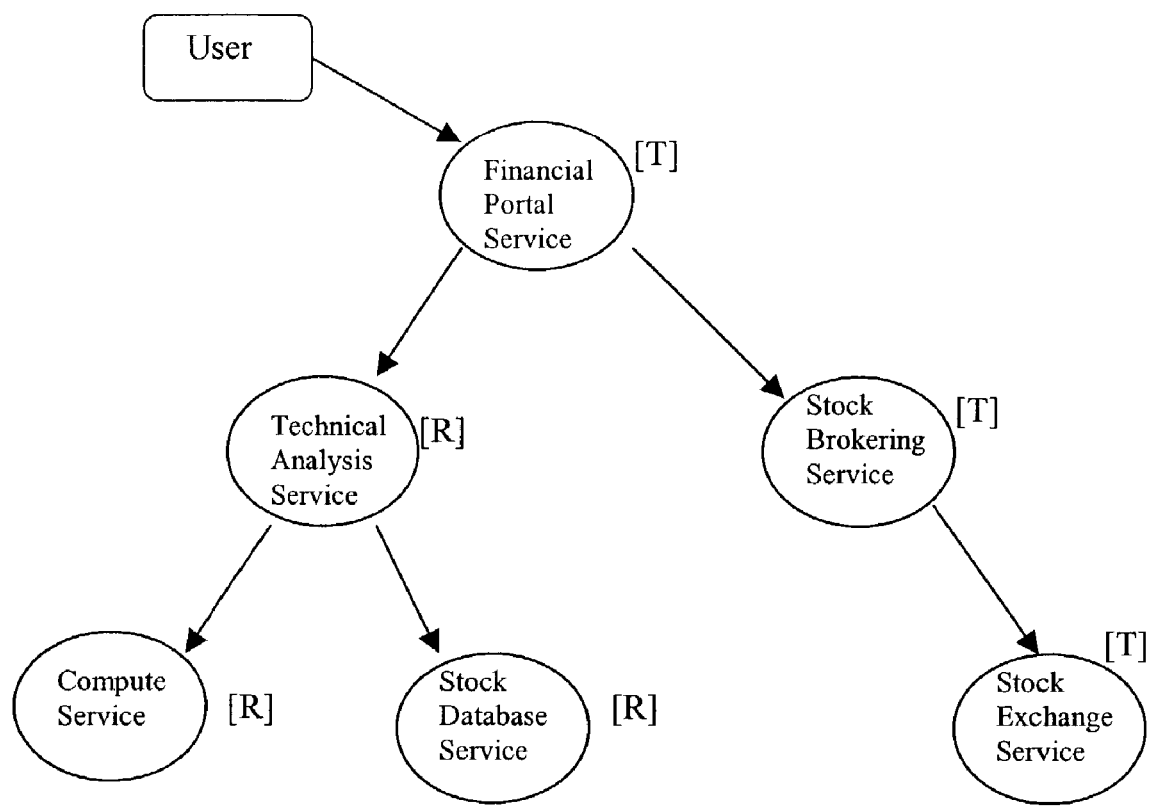
FIG. 3 is a schematic representation of a hierarchy of services of an example composite financial portal e-Service according to an implementation of the invention.

FIG. 3 depicts a Financial Portal example, which can be mapped onto services S1-S6 in FIG. 2. The Financial Portal service manages stock portfolios for its customers. It uses a Technical Analysis service to analyze the performance of stocks in the market. It also uses a Stock Brokering service that buys and sells stocks in a stock exchange. The Technical Analysis service uses the Compute service to run its analysis algorithms. It also uses a Stock Database service which provides historical information about various stocks. The Stock Brokering service trades stocks using the Stock Exchange.

A typical usage scenario involves a user who wishes to invest a certain amount of money in stocks—she invokes the invest(amount) operation on the Financial Portal service. This service in turn invokes recommendStocks(userProfile) on the Technical Analysis service, to determine the stocks to buy, given this user's pro-file (risk appetite, sectoral preferences, etc.). The Technical Analysis service executes its algorithm using the Compute service's submitjob( ) operation. The algorithm uses the Stock Database service to obtain historical data for various stocks, using the getStockHistory(stockId) method. After getting the list of recommended stocks and the respective amount to invest from the Technical Analysis service, the Financial portal invokes the Stock Brokering service's executeTrade(trade) method to purchase stocks on behalf of the user. The Brokering service in turn uses the Stock Exchange service's placeorder(order) operation to actually buy the stocks.

FIG. 3 also shows labels for each service identifying a category (R or T), and the various types of pairwise compositions (described previously) are apparent in the example. The Financial Portal charges its customers on the basis of application-level metrics such as the actual amount invested. The Stock Brokering service too is of Type T, since it charges a fixed brokerage per trade. The Stock Exchange service charges each Stock Brokering service a monthly or annual fee for subscription to the exchange. The Compute service and the Stock Database are resource-centric, since they act as wrappers for resources (CPU and database respectively). Their charging is based on the resource consumption. The Technical Analysis service's algorithm could execute for varying periods depending upon the user portfolio and historical data of the stocks under consideration—its usage of underlying services cannot be predicted from the input parameters. Therefore, its charging metrics consist of a fixed algorithm "license fee" as well as the metrics reported by the underlying services.

An example implementation of the above example has been built using Grid Services running on the Open Grid Services Infrastructure. A background to Grid Services is available from the following source materials:

1. I. Foster, C. Kesselman, J. Nick, and S. Tuecke, "The Physiology of the Grid: An Open Grid Services Architecture for Distributed Systems Integration", 2002. (At the time of writing, this document is available from www.globus.org/research/papers/ogsa.pdf).

2. Open Grid Services Infrastructure, OGSI Technology Preview Release, 2002. (at the time of writing, this software is available from www.globus.org/ogsa/releases/TechPreview).

3. S. Tuecke, K. Czajkowski, I. Foster, J. Frey, S. Graham, and C. Kesselman. Grid Service Specification, February 2002. (At the time of writing, this document is available from www.globus.org/research/papers.html).

The service interfaces comprise WSDL documents, and SOAP over HTTP was used for making RPC-style invocations. The globally unique identifier for each request was sent as context information in the SOAP message header.

In the example implementation, the service usage metrics for each service are computed as described above, and metering records are sent to an Accounting Service. The Accounting Service uses request-ids (UUIDs) to index the metering records for faster correlation. The Correlator module supports all the types of service composition described previously. The Accounting module maintains accounts corresponding to each <user, service> pair in the composition hierarchy. It also generates accounting records for these accounts at each billing cycle, by aggregating the corresponding metering records.

Particular advantages of the invention according to the preferred embodiment described above are the achievement of:

Analysis of e-services and their composition with the perspective of metering and accounting for their usage, leading to a taxonomy.

An architecture for usage metering and accounting for composite services, that operates at request-level granularity.

A mechanism/protocol for correlating per-request metering data in composite services.

A metering and accounting solution which supports a range of pricing, charging and business models for service usage.

In an alternative embodiment, the correlation component of the accounting service can be implemented within a separate service outside the accounting service.

Figure 5:
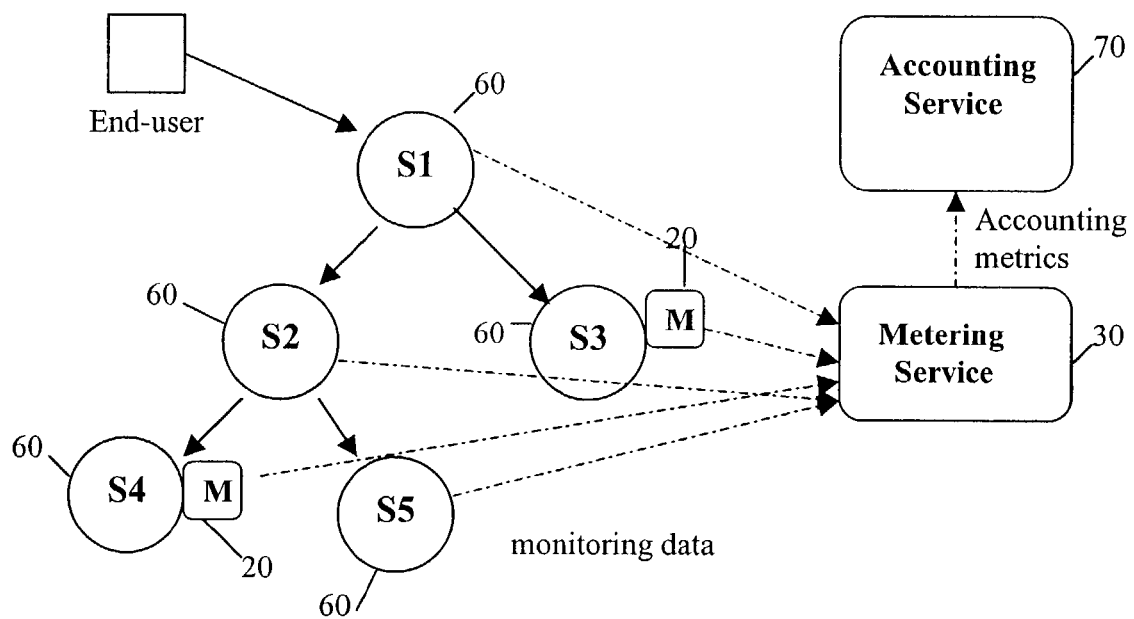
FIG. 5 shows a metering and accounting solution architecture including a metering service which is separate from the user-requested services.

The above description includes metering modules 30 associated with each service, which output metering records to a centralized accounting service 70 including a correlator component 110. As shown in FIG. 5, the metering function could alternatively be implemented as a separate metering service (as with other e-services) instead of being integral with the service to be monitored.

According to the embodiment of FIG. 5, each service S1-S5 registers with the metering service at deployment time. For every request, the service (S1-S5) sends an initiation request to the metering service. This request includes a service generated correlation id, and other contextual information. The functions of the metering service include some or all of the following tasks:

Collecting and storing raw monitoring information. The raw information to be maintained (and typically also the format) is dictated by the service.

Maintaining these values on a per service, per user basis to be able to provide per user usage. For a composite service, this means that the metering service has to collect the usage of all the underlying services in the composite tree and maintain a correlation amongst service invocations that have resulted from the same end-user request. This is necessary to aggregate the total usage of the composite service.

Obtaining the Usage model (i.e., in what metrics is the usage of resources reported) and Accounting model (i.e., function that determines how the service usage is computed, from the reported resource usage metrics, in terms of accounting metrics such as grid-units) of each of the component services in the composition tree for use in computing the final usage.

Periodically or after completion of every request, compute the corresponding accounting metrics.

Reporting the computed accounting metrics to the respective accounting services of the services involved in the composition tree.

This model has certain advantages such as that an external monitor supplied by a third party or the middleware can take responsibility for reporting the metrics to the metering service. Moreover, the service need not concern itself with accounting related functions. Since the metering service needs the usage and accounting models of the services involved, these may actually be exported as part of the service description. Also, since all the monitoring information comes to the metering service, it is in a position to log all that usage information for later use such as reporting or for statistical purposes. Further, an existing service need not be changed to adapt to this model.

However, there are also a number of less positive characteristics of this specific model.

For a composite service, the metering service has to correlate the metering information, corresponding to an end user request, for all the underlying services. Moreover, this correlation has to be done for each service, so that an underlying service of a composite tree can charge its calling service for its usage. Correlating the metering information would require the use of a correlation id. Each request results in generation of a new correlation id by the service. For composite services, where a user request may spawn multiple requests to underlying services, through iterations, several new ids may get generated. Generating, maintaining and communicating so many ids to the metering service is an unwanted overhead and adds complexity.

The metering service may not know when the underlying service has completed its work. In other words, it does not know how long to wait for receiving the monitoring information from component services of a composed service. One mechanism to do this is to have a method to indicate start and end of metering a request. Then each component service of a composite tree would send a metering completion message once its local job is done. These metering completion messages would help in determining when the underlying services have finished their tasks and the aggregate of the request can be computed.

All the contextual information related to a particular request has to be communicated to the metering service. Such contextual information could include an upper limit on the resource usage of that particular request. For long running jobs, an interval at which to report the intermediate usage would need to be specified in order to ensure that the user's quota is not getting exceeded. This also implicitly assumes that the metering service implements a condition evaluation engine and a notification module to inform the corresponding service if the request exceeds its upper limit.

A centralized metering service may not be desirable from a scalability point of view. Therefore, a variant of the current model is to allow multiple metering services. Each individual service then has the choice to register with any metering service and one or more services may share a common metering service. This variation brings up additional issues related to aggregation of the accounting information for a composite request. The calling service would have to inform its metering service about the metering services of the underlying services. Since only authorized users are allowed to access the metering information, the calling service would have to send its metering service's authentication information to its underlying service. This information would have to be sent as the meta information of the request.

Since monitoring information of each service is reported to the metering service there may be performance issues arising out of numerous messages being generated.

A further embodiment of the invention distributes the correlation functionality as well as the metering functionality into the e-services themselves. Each composite service then correlates usage data for the component services it invokes, or correlation is implemented by service hosting platforms on behalf of services such that service developers can focus solely on the business logic of the service. An example implementation for this further embodiment is an ARM-compliant implementation which extends ARM to metering of services as against its original purpose of facilitating performance management.

Figures 6, 7A, 7B:
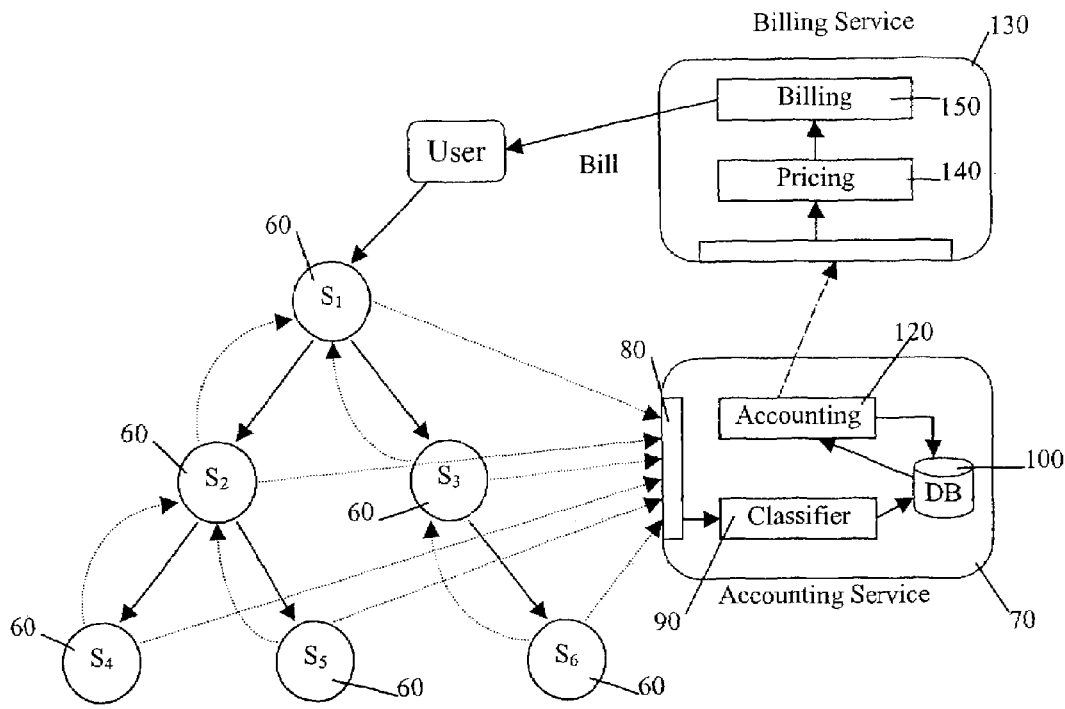
FIG. 6 shows a metering and accounting architecture according to a distributed metering and correlation implementation of the invention.
FIGS. 7A and 7B show the data elements of example metering records according to two alternative embodiments of the invention.

Referring to the last paragraph, an embodiment of the invention will now be described in more detail in which metering records for different services are correlated in a distributed way at each node in the service hierarchy. FIG. 6 shows a distributed metering and accounting architecture in the context of a composite service hierarchy consisting of services S1 through S6.

As with the embodiment described previously, each service registers with an accounting service—specifying the business models it supports, the names of its usage metrics and the functions to be used to aggregate different values of those usage metrics.

A request sent to service S1 results in requests to services S2 and S3, which in turn result in requests to underlying services. To measure the service usage, each service incorporates a meter (not shown in the figure) that generates a metering record containing per-request service usage information. This metering record for each request is created by correlating the usage information of that request with the corresponding usage information of requests to its underlying services. Therefore, each called e-service sends its metering record to the caller. Moreover, each service treats its caller (another service or end-user) as its user and needs to charge it accordingly. Hence, each service in the hierarchy is also required to send its metering record to the accounting service.

The classifier module in the Accounting service classifies an incoming metering record on per service, per user basis and stores it in a database. The accounting module fetches these metering records from the database periodically, and aggregates them for each <customer, provider> pair. The aggregation is done in accordance with the business model followed for that particular customer-provider relationship and results in the creation of an accounting record. At each billing cycle the accounting service supplies these accounting records to the Billing Service. The pricing module in the Billing service applies a service-provider supplied pricing function to these accounting records in order to compute the amount to be charged from the users. The billing module then prepares the bills and sends to individual users. Implementations may choose to combine the Accounting and Billing functionality into one service.

Distributed Correlation

Each incoming request to a service contains a globally unique request identifier generated by the caller. If the caller is a user application, it may not generate such identifiers in which case the called service must locally generate an identifier for the incoming request.

A service generates a metering record (as shown in FIG. 7B) once it has finished its processing of the request and has also received all the metering records for invocations to underlying services. This metering record contains the following information—
1. The globally unique request-id identifying the incoming request.
2. The service-id of the called service.
3. The ID of the caller.
4. Name of the operation invoked.
5. The metering metrics and their values.

The meter attached to each service correlates the metering record from the underlying services. It maintains the information about each incoming request and the corresponding invocations to underlying services. The service informs the meter about the end of the request, and gives it the usage metrics of local execution. Alternatively, the meter can get these metrics directly from the monitor.

Figure 8:
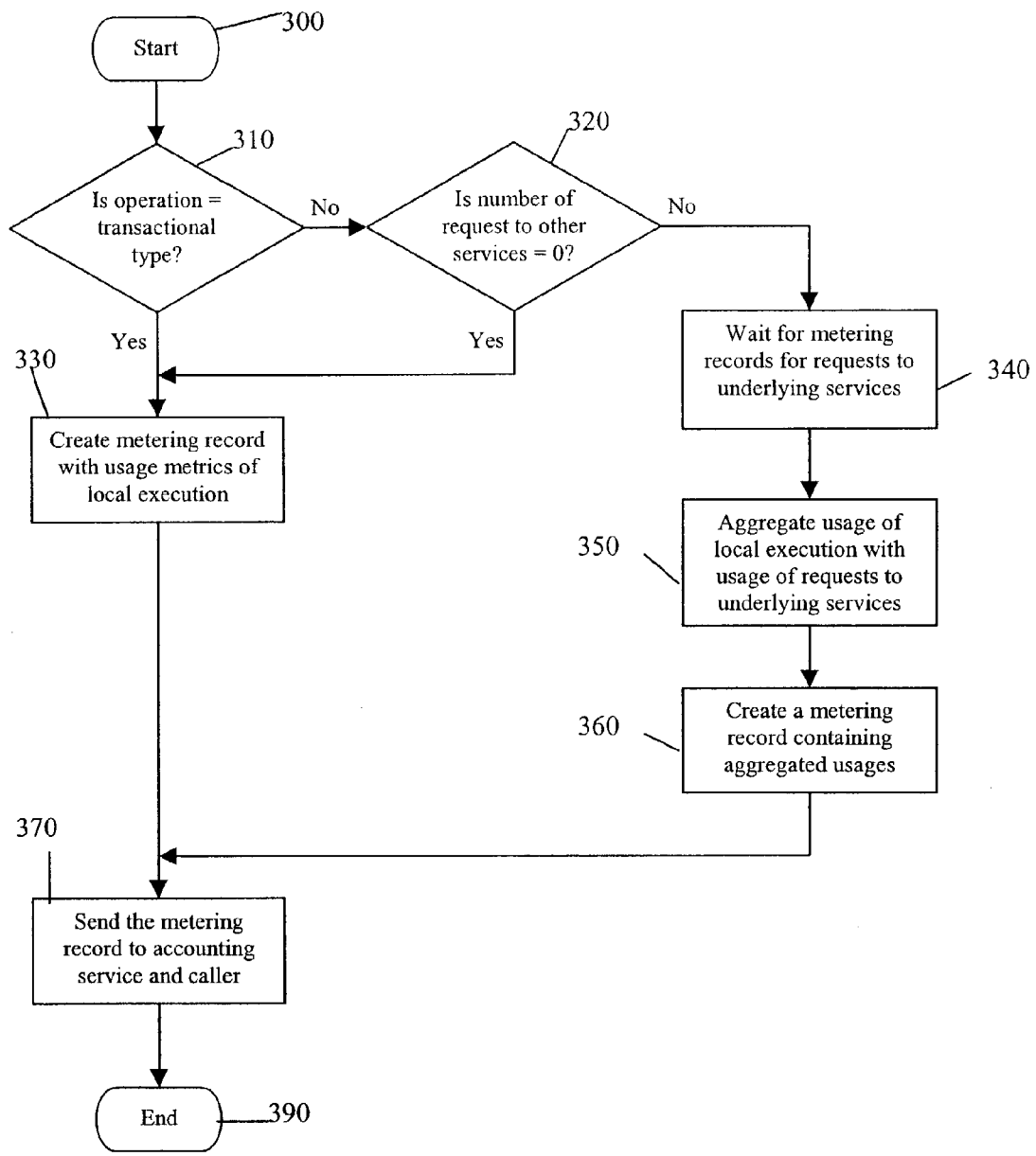
FIG. 8 shows the steps of a correlation method triggered by an end-of-request event according to an embodiment of the invention.

The distributed correlation processing is shown in FIG. 8. At the end of local execution of a request, the meter of the service is notified 300. At that moment, the meter checks 310 whether the operation was of a transactional type. If it is, then it does not depend on the usage of lower level services. Hence, the meter creates 330 a metering record with the usage metrics of local execution and sends it 370 to the accounting service. It also sends 370 this metering record to the calling service, for further correlation. If the operation is not of transactional type, then it checks 320 if there are any invocations to other services. If there are no invocations to other services, the meter creates 330 a metering record, which is then sent 370 to its accounting service, and its caller, as explained above. If the operation is not of transactional type and there are invocations to some other services then it needs to correlate this request with requests to those underlying services.

The meter waits 340 for metering records of requests to underlying services. These metering records are then correlated and aggregated 350 with the local usage information, resulting in the creation of metering record 360 containing aggregated usages. This metering record is then sent 370 to its accounting service and its caller, as explained above.

To send the metering record to the caller, the meter of the called service should know the address of the calling service. One way to enable this is for the caller to send its address along with each request. Alternatively, the address of the caller may be communicated during a handshake that occurs between the client (caller) and the service (callee) prior to any requests. As noted in relation to the previously described embodiment, handshaking may also be needed for setting up service-level agreements for example.

In a further embodiment, the functionality of the accounting service could be implemented as part of the service itself. In this case, the user accounts are maintained in the service itself. Hence, the service does not need to send the metering record to accounting service. It does the aggregation of metering records according to the business models at each billing cycle and sends the generated accounting records to the billing service.

In a further embodiment, the functionality of the billing service could also be implemented as part of the service itself. At each billing cycle, the service computes the amount to be charged by applying the pricing formula to the generated accounting records. It then prepares the bill and sends it to the user. In this case the service is self-sufficient and does not need the help of any other services for its metering, accounting and billing functionality. It only needs to send the metering records to the calling service for further correlation.

What is claimed is:

1. A method for metering usage of composite services which are accessed via a network, the method comprising:
   requesting a composite service by a user program,
      wherein said composite service comprises service composition pairs, in which a higher level service invokes a lower level service and a charging model of said higher level service determines said charging model of a service composition pair, said composition pairs comprising:
         a transaction service over a resource-centric service, in which metering information for a lower resource-centric service, including resource consumption metrics, and for a higher transaction service, including transaction usage metrics, is charged per transaction;
         a composite resource-centric service, in which metering information for a lower resource-centric service, including lower resource consumption metrics, and for a higher resource-centric service, is charged for composite resource consumption;
         a composite transactional service, in which metering information for a lower transactional service, including lower transaction usage metrics, and for a higher transaction service, including higher transaction usage metrics, is charged for composite transaction usage; and
         a resource-centric over a transaction service, in which metering information for a lower transaction service, including lower transaction usage metrics, and for a higher resource-centric service, including higher resource consumption metrics, is charged for resource consumption;
   generating partial metering records for all service requested by said composite service, said partial metering records corresponding to each requested service, including identities of each higher and lower service of a service composition pair, and an appropriate charging model;
   sending said partial metering records to an accounting service; and
   correlating said partial metering records, by said accounting service, based on a hierarchical-tree of said service composition pairs, to create a complete metering record of said requested composite service.

2. The method of claim 1, all the limitations of which are incorporated herein by reference, further comprising creating an accounting record that identifies a customer that requested said composite service and a provider of said composite service.

3. The method of claim 2, all the limitations of which are incorporated herein by reference, further comprising applying a pricing policy to said accounting record to generate an invoice.

4. The method of claim 2, all the limitations of which are incorporated herein by reference, further comprising aggregating service usage accounting data on a per customer and per provider basis to generate aggregate accounting records for a billing period.

5. The method of claim 1, all the limitations of which are incorporated herein by reference, further comprising marking records of metered usage data as complete if any of the following conditions is satisfied:
- a set of requested component services is empty; and
- metered usage data is available for all of the set of requested component services and has been successfully correlated to generate composite service usage data.

6. The method of claim 1, all the limitations of which are incorporated herein by reference, further comprising registering said composite service with a respective accounting service, the step of registering comprising providing the accounting service with an identification of at least one charging model supported by the composite service.

7. The method of claim 3, all the limitations of which are incorporated herein by reference, wherein the accounting service comprises determining a charging model for the composite service in accordance with charging models supported by the composite service.

8. The method of claim 7, all the limitations of which are incorporated herein by reference, further comprising generating charging data from said composite service usage data and said charging models.

* * * * *